(12) United States Patent
Passaretti et al.

(10) Patent No.: US 9,920,785 B2
(45) Date of Patent: Mar. 20, 2018

(54) ARTICLE WITH SELECTIVELY ACTUATABLE SUCTION CUP CONSTRUCTION

(71) Applicant: TOWN & COUNTRY LINEN CORP., New York, NY (US)

(72) Inventors: Robert Passaretti, New York, NY (US); Gina Barnaba, New York, NY (US); Jeffrey Beyda, New York, NY (US)

(73) Assignee: Town & Country Linen Corp., New York, NY (US)

( * ) Notice: Subject to any disclaimer, the term of this patent is extended or adjusted under 35 U.S.C. 154(b) by 13 days.

(21) Appl. No.: 15/000,860

(22) Filed: Jan. 19, 2016

(65) Prior Publication Data

US 2017/0202281 A1    Jul. 20, 2017

(51) Int. Cl.
| | |
|---|---|
| *A41D 13/08* | (2006.01) |
| *A41D 19/01* | (2006.01) |
| *A41D 19/00* | (2006.01) |
| *F16B 47/00* | (2006.01) |
| *A47J 45/10* | (2006.01) |

(52) U.S. Cl.
CPC .............. *F16B 47/00* (2013.01); *A41D 19/01* (2013.01); *A47J 45/10* (2013.01); *A41D 13/082* (2013.01)

(58) Field of Classification Search
CPC .............. A41D 19/01529; A41D 19/01; A41D 19/01594; A41D 19/02; A47J 36/34; F16B 47/00
USPC ........................................ 2/16, 158, 159, 160
See application file for complete search history.

(56) References Cited

U.S. PATENT DOCUMENTS

| | | | |
|---|---|---|---|
| 6,675,392 B2 * | 1/2004 | Albert .............. | A41D 19/01558 2/161.1 |
| 7,124,446 B2 * | 10/2006 | Demay ............ | A41D 19/01529 2/16 |
| 7,743,690 B2 * | 6/2010 | White .................. | A41D 13/087 2/16 |
| D634,898 S * | 3/2011 | Lion ........................... | D29/119 |
| 2005/0108802 A1 * | 5/2005 | Burnett ................ | A41D 13/087 2/16 |
| 2009/0100562 A1 * | 4/2009 | Liang .................... | A41D 19/01 2/20 |

\* cited by examiner

*Primary Examiner* — Khaled Annis
*Assistant Examiner* — Timothy K Trieu
(74) *Attorney, Agent, or Firm* — Leason Ellis LLP (57) ABSTRACT

A selectively actuatable suction cup construction is configured to be incorporated into an article, such as a kitchen accessory (e.g., a combined trivet and oven mitt product) or other product and is configured such that it can be placed in either an "actuated mode" or an "inactive mode".

18 Claims, 8 Drawing Sheets

Fig. 10 too long configured to be incorporated into an article of manufacture. The drawings attached hereto and the following description describe a number of different articles of manufacture; however, the scope of the present invention is not limited to articles of manufacture described and illustrated herein. Instead, one of skill in the art will readily appreciate that the selectively actuatable suction cup construction can be incorporated into other articles as well. In general, the selectively actuatable suction cup construction allows the article to have either an actuated mode ("on mode") in which the suction cup is capable of securely attaching to a surface (of an object) and an inactive mode ("off mode") in which the suction cup is not capable of attaching to the surface.

Figure 1:
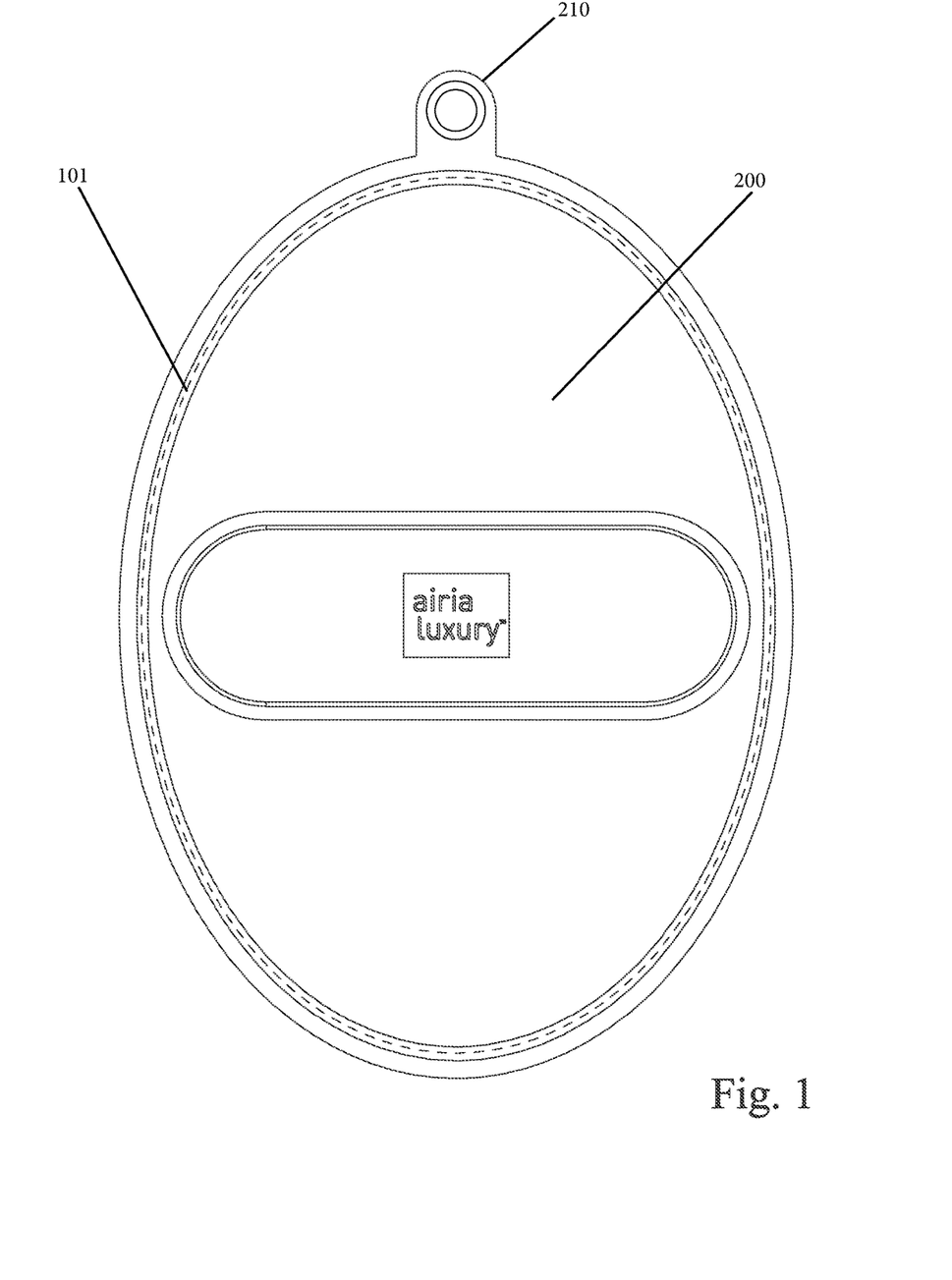
Figure 2:
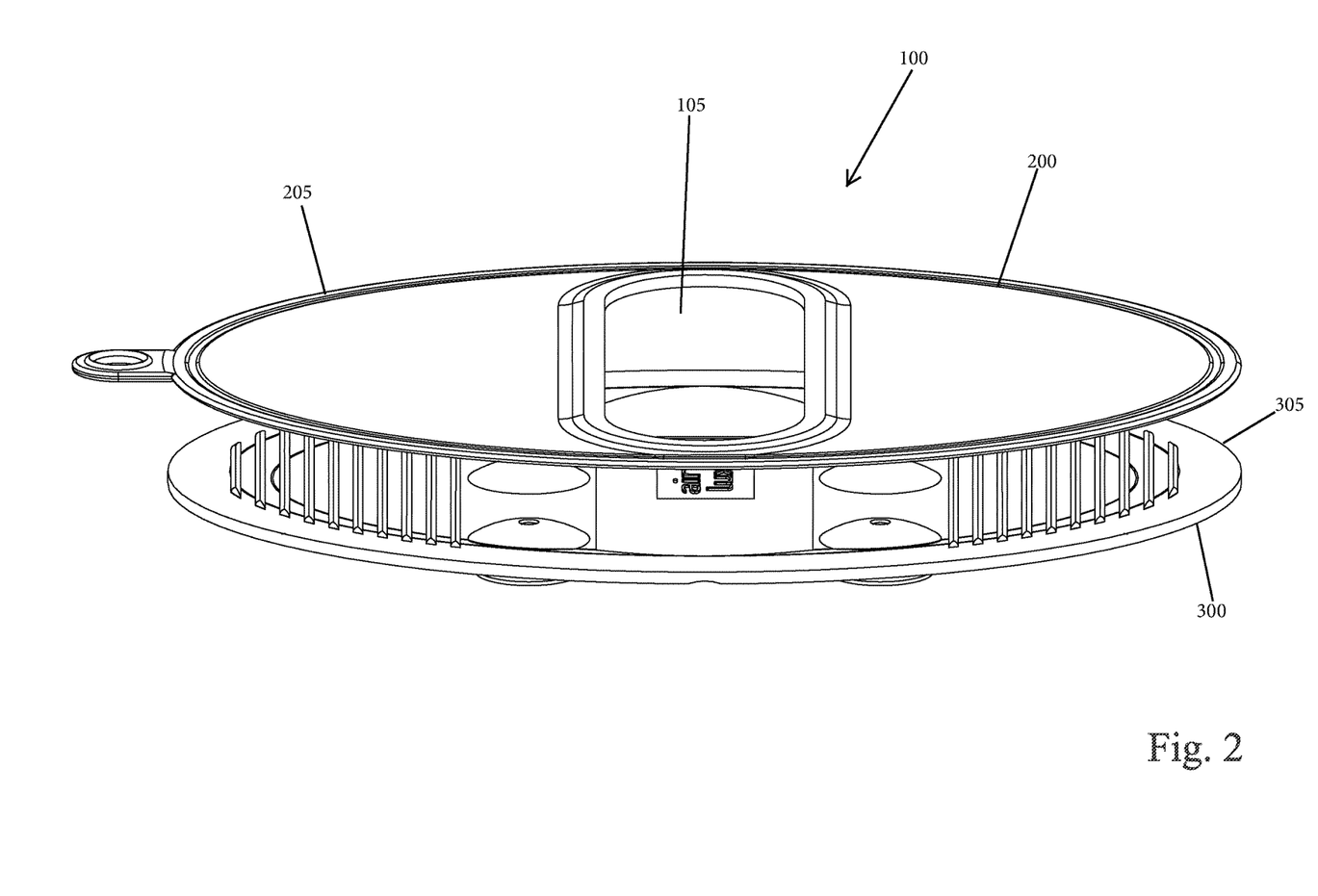
Figure 3:
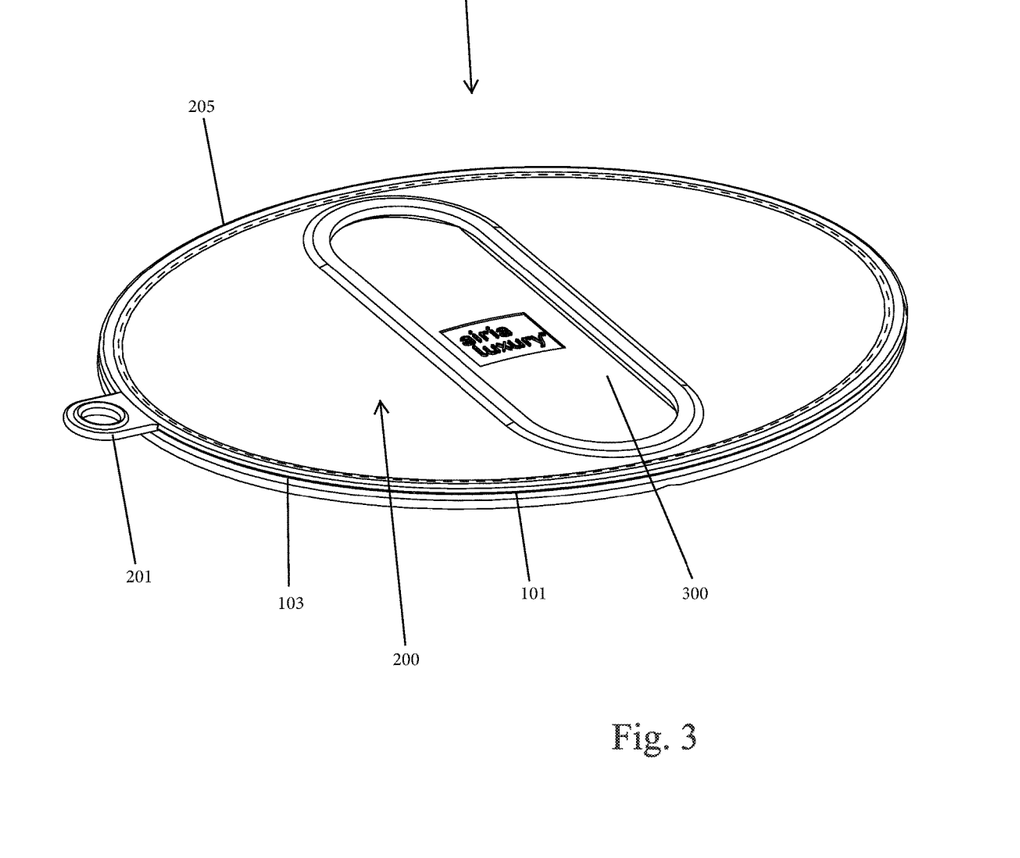

For purpose of illustration only, the selectively actuatable suction cup construction is described and shown as being incorporated in a kitchen accessory. More specifically, FIGS. 1-3 illustrate a combined trivet/oven mitt product 100 in accordance with the present invention. As discussed herein, the product 100 is constructed such that it acts as a trivet in one mode of use and acts as an oven mitt in another mode of use. These two modes of use are provided in a single structure, thereby eliminating the need to purchase and maintain in the kitchen a separate trivet and oven mitt. It will be appreciated that the product 100 can come in any number of different sizes and shapes and the present figures only depict one exemplary embodiment of the product 100. Other shapes and sizes are equally possible and are within the scope of the present invention. The functionality of the product 100 is described in detail herein following the discussion of the individual parts that make up the product 100.

The product 100 comprises a first part 200, which can be thought of as being an upper part, and a second part 300, which can be thought of as being a lower part. As shown in FIGS. 1-3, the first and second parts 200, 300 preferably have complementary shapes and sizes such that a peripheral edge 205 of the first part 200 generally aligns with and overlies a peripheral edge 305 of the second part 300. As shown in the figures, the first and second parts 200, 300 do not entirely overlap one another in that, as shown in the figures, the first part 200 can contain a finger portion (protrusion or tab) 210 that defines a periphery of the first part 200 and extends beyond the corresponding peripheral edge 305 of the second part 305. The functionality of the finger portion 210 is discussed below.

The first and second parts 200, 300 can be formed of any number of different materials so long as the materials are suitable for the present use. More specifically, the material has to be flexible and has to withstand the heat that is generated from hot objects (e.g., hot pots and pans) that are placed in intimate contact therewith. In one exemplary embodiment, the first and second parts 200, 300 comprise molded silicone parts.

The first and second parts 200, 300 are attached to one another using any number of traditional techniques. For example, the first and second parts 200, 300 can be attached to one another along the overlying peripheral edges 205, 305. In the illustrated embodiment, the attachment between the two parts 200, 300 is achieved by stitching the two parts 200, 300 together along the peripheral edges 205, 305 thereof (e.g., using DTM (dye to match) stitching). The stitching is shown in the figures and is identified with reference character 101 (the stitching 101 can be contained in a molded channel 103 as shown). As described below, the product 100 has a central access opening to allow a user to place his or her hand within a hollow interior (interior space) formed between the first and second parts 200, 300. The central access opening is identified at 105 in the figures and, as described below, comprises an opening formed in the first part 200.

Figures 4, 5, 6:
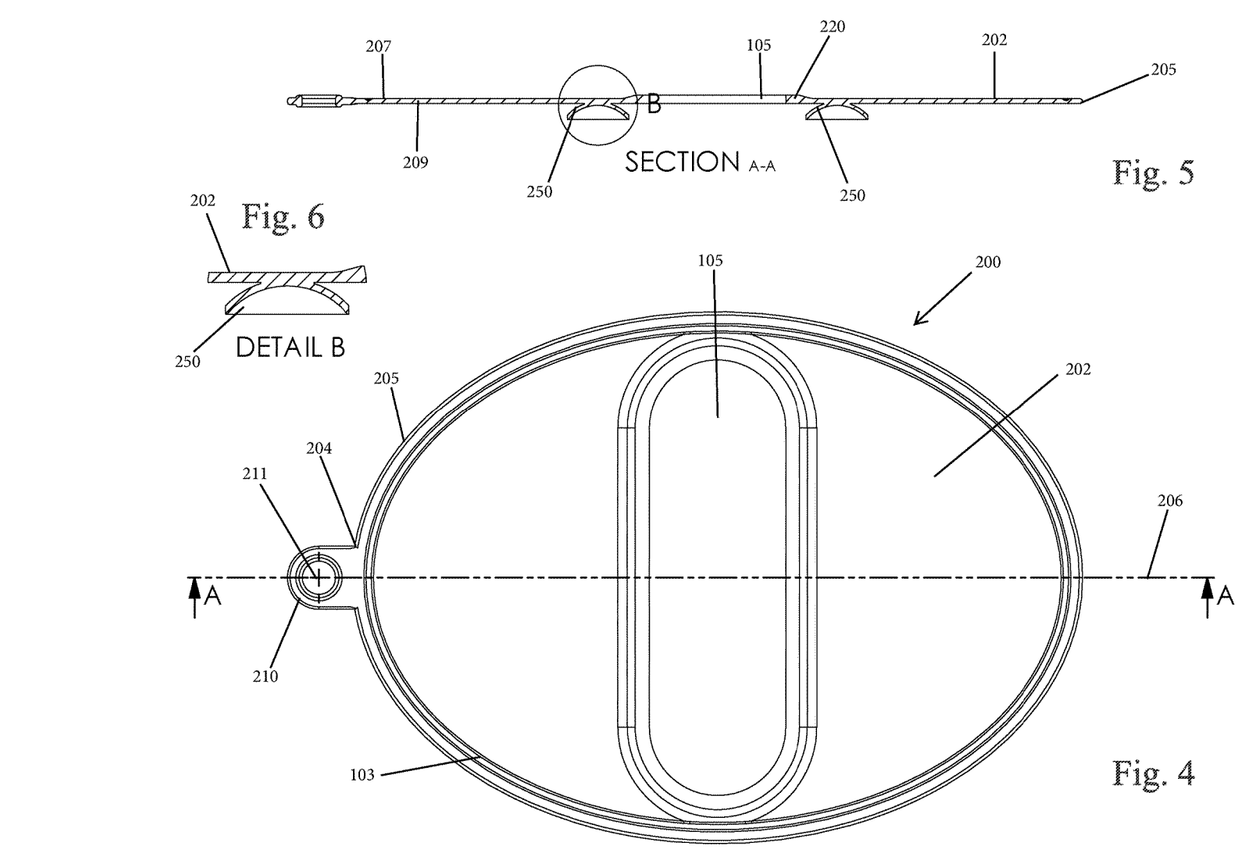

With reference to FIGS. 4-6, the first (upper) part 200 includes a body 202 defined by peripheral edge 205. The body 202 has a first end 204 and an opposing second end 206 (which can be a mirror image of end 204). At the first end 204 according to one embodiment, the finger portion 210 is provided and extends outwardly therefrom. The finger portion 210 has a hole 211 formed therein. The finger portion 210 is in the form of a hanging loop. For example, a hook or the like can be passed through the hole 211 to allow the product 100 to be hung when not in use.

As previously mentioned, the first part 200 has an opening 105 formed therein and preferably, opening 105 is formed centrally. The opening 105 can be formed to have any number of different shapes and sizes; however, the opening 105 should be configured and sized to receive a hand of the wearer. It will therefore be appreciated that since different people have different sized hands, the product 100 can come in more than one size, such as small, medium and large. Alternatively, the product 100 can come in a single unisex size.

In the illustrated embodiment, the opening 105 has an oblong shape with curved ends. As shown, the curved ends are spaced from the peripheral edge 205. As shown in FIG. 5, the opening 105 can be formed in a central reinforced portion 220 of the first part 200 in that the central reinforced portion 220 has a greater thickness than surrounding areas of the body 202. This reinforcement in the area immediately surrounding the opening 105 ensures that the first part 200 remains robust during repeated use including repeated insertion and withdrawal of a hand through the opening 105.

The body 202 of the first part 200 has a first (top) face or surface 207 and an opposing second (bottom) face or surface 209. As shown in FIG. 5, the bottom surface 209 (i.e., the underside of the body 202) includes a plurality of flexible suction cup caps (concave shaped members) 250 (i.e., a set of first suction cup caps 250). The suction cup caps 250 are arranged such that a first set (e.g., 3 suction cups) is arranged along a first longitudinal edge of the opening 105 and a second set (e.g., 3 suction cups) is arranged along a second longitudinal edge of the opening 105. It will be appreciated that the suction cup caps 250 of the first set are preferably arranged linearly and similarly, the suction cup caps 250 of the second set are preferably arranged linearly. The suction cup caps 250 thus extend across a width of the body 202.

However, it will be appreciated that the foregoing arrangement of suction cup caps 250 is merely exemplary in nature and not limiting of the present invention. Thus, the suction cup caps do not have to be formed in a linear manner nor do they have to extend across the width of the body 202. The suction cup caps 250 can thus be arranged according to another orderly pattern or can be arranged in a random pattern across the bottom surface of the body 202. In addition, there does not have to be distinct sets of suction cup caps 250 but instead, the suction cup caps 250 can be grouped singularly or in other uniform or non-uniform groups.

It will also be understood that the bottom surface 209 can be formed without suction cup caps 250 so long as the bottom surface 209 is capable of being placed in intimate contact with the second part 300 and function in the manner described below. In this alternative embodiment, the bottom surface 209 can be an at least substantially planar surface or in another embodiment, the bottom surface 209 can have a series of raised portions that contact selective portions of the second part 300.

The illustrated first part 200 has an oval shape; however, it will be understood that the first part 200 can be formed to have any number of other shapes, including circular, triangular, square, etc.

Figure 7:
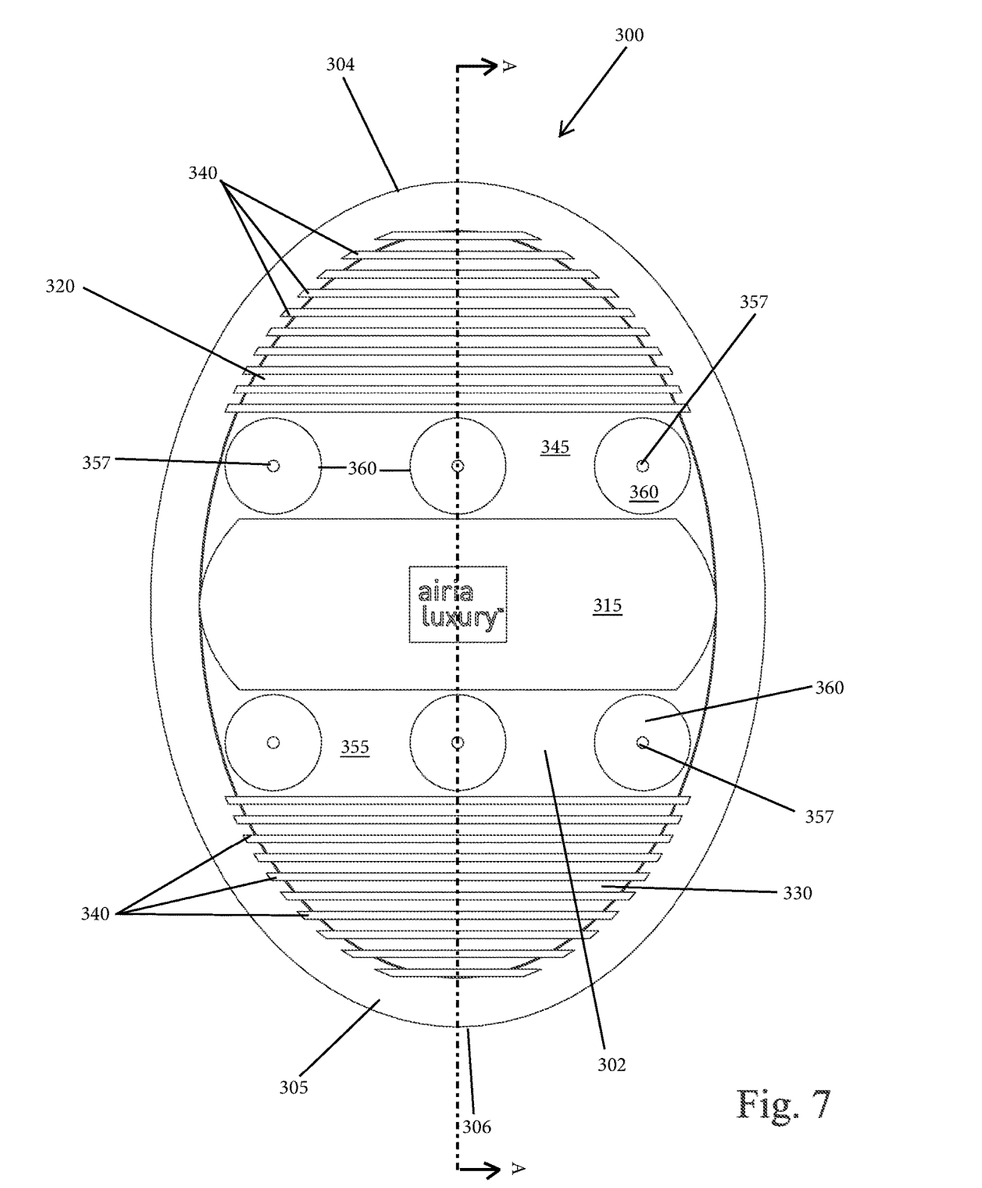
Figure 8:
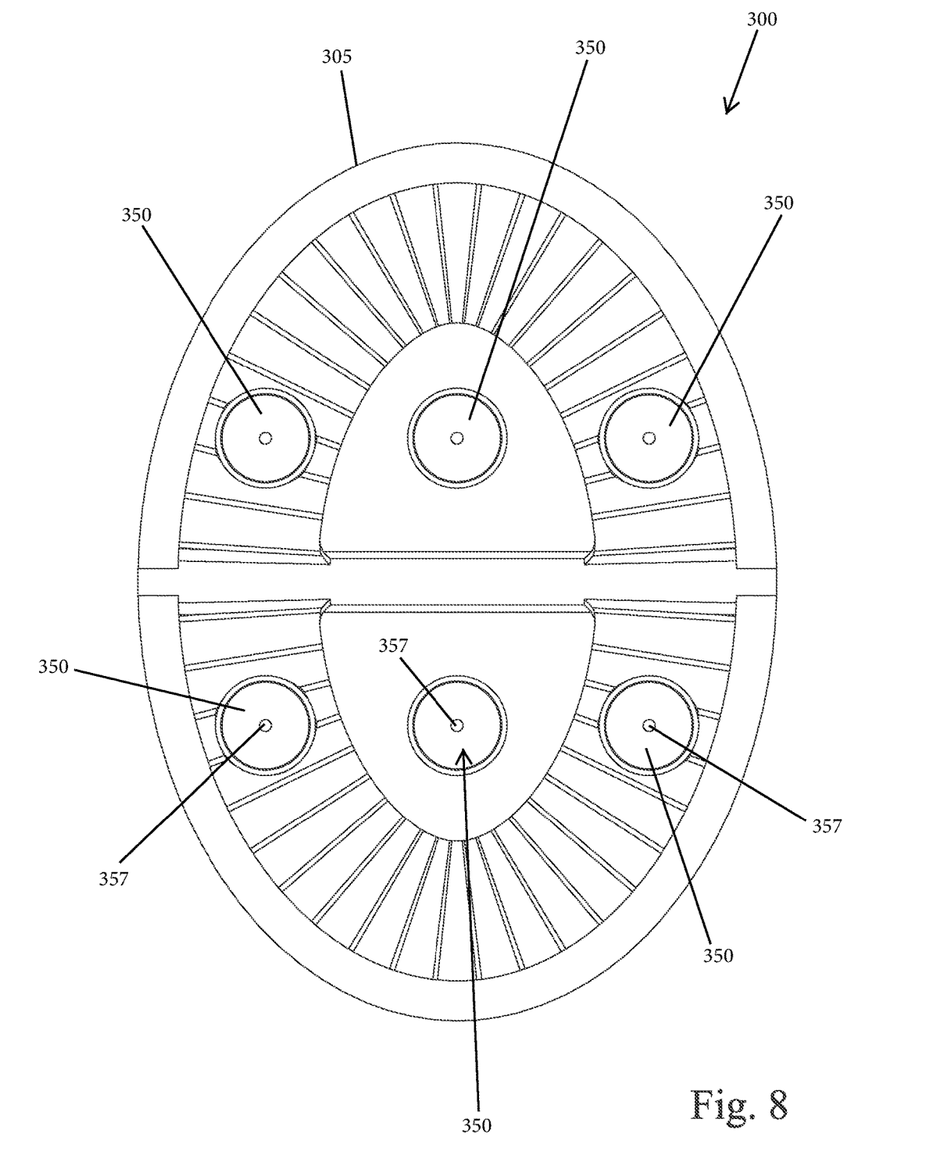
Figure 9:
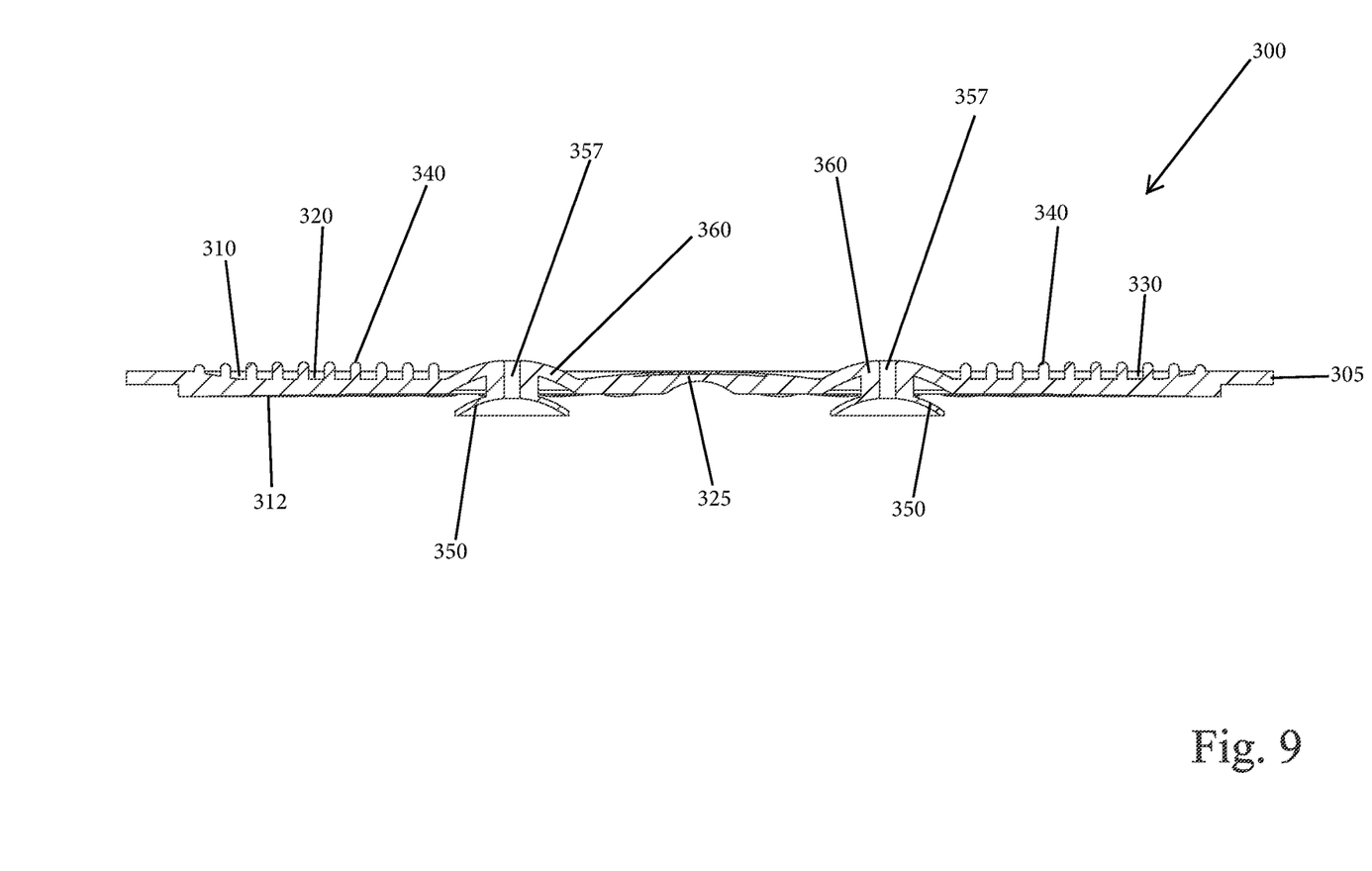

With reference to FIGS. 7-9, the second (bottom) part 300 includes a body 302 defined by peripheral edge 305. The body 302 has a first end 304 and an opposing second end 306. The body 302 also includes a first (top) surface 310 and an opposing second (bottom) surface 312. The top surface 310 faces the bottom surface 209 of the first part 200 when the product 100 is constructed. It will therefore be appreciated that the top surface 310 and the bottom surface 209 defines the hollow interior within the product 100 that can receive the wearer's hand. The second part 300 has a central area 315 that defines part of the top surface 310. The central area 315 defines a space that can receive product or manufacturing indicia. When the first and second parts 200, 300 are attached to one another, the central area 315 lies below the opening 105 and is thus visible to the user.

As shown in FIG. 9, the bottom surface 312 of the body 302 can include a recessed portion 325 that lies below the central area 315. This recessed portion 325 allows the product 100 to be easily creased when used as an oven mitt.

The body 302 also includes first and second end portions 320, 330 that are located at the first and second ends 304, 306, respectively. The first and second end portions 320, 330 can contain modified surfaces along the first surface 310. More specifically, as shown, the first end portion 320 can contain a plurality of raised ribs 340 that are arranged parallel to one another and similarly, the second end portion 330 also contains a plurality of raised ribs 340 that are arranged parallel to one another. Since the body 302 has an oval shape, the lengths of the raised ribs 340 vary with the ribs 340 closest to the ends 304, 306 being shorter than the ribs 340 closest to the central area 315. The heights of the ribs 340 are preferably at least the same so that the tops of the raised ribs 340 lie in the same plane. The tops of the raised ribs 340 can be rounded. The spacing between the ribs 340 can be the same (as shown) or can vary.

The ribs 340 provide stability to the user and enhance the grip of the user when the user's hand is inserted into the accessory 100. However, the ribs 340 are not necessary and the accessory 100 can equally be formed without the ribs 340 and/or the ribs 340 can be arranged in different patterns.

Between the central area 315 and each of the first and second end portions 320, 330, there are first and second intermediate portions 345, 355, respectively. The first intermediate portion 345 lies between the first end portion 320 and the central area 315 and the second intermediate portion 355 lies between the second end portion 330 and the central area 315. Similar to the first part 200, the second part 300 includes a plurality of suction cup features.

As shown in FIG. 9, the bottom surface 312 (i.e., the underside of the body 302) includes a plurality of suction cups 350 (i.e., a set of first suction cups 350). As is known and discussed above, suction cup 350 is an object that uses the negative fluid pressure of air or water to adhere to nonporous surfaces, creating a partial vacuum. The working face of the suction cup is made of elastic, flexible material and has a curved surface. When the center of the suction cup is pressed against a flat, non-porous surface, the volume of the space between the suction cup and the flat surface is reduced, which causes the air or water between the cup and the surface to be expelled past the rim of the circular cup. The cavity which develops between the cup and the flat surface has little to no air or water in it because most of the fluid has already been forced out of the inside of the cup, causing a lack of pressure. The pressure difference between the atmosphere on the outside of the cup and the low-pressure cavity on the inside of the cup keeps the cup adhered to the surface. The use of the suction cups 300 is described below.

The suction cups 350 are arranged such that a first set (e.g., 3 suction cups) is arranged within the first intermediate portion 345 and a second set (e.g., 3 suction cups) is arranged within the second intermediate portion 355. It will be appreciated that the suction cups 350 of the first set are preferably arranged linearly and similarly, the suction cups 350 of the second set are preferably arranged linearly. The suction cups 350 thus extend across a width of the body 302.

However, it will be appreciated that the foregoing arrangement of suction cups 350 is merely exemplary in nature and not limiting of the present invention. Thus, the suction cups do not have to be formed in a linear manner nor do they have to extend across the width of the body 302. The suction cups 350 can thus be arranged according to another orderly pattern or can be arranged in a random pattern across the bottom surface of the body 302. In addition, there does not have to be distinct sets of suction cups 350 but instead, the suction cups 350 can be grouped singularly or in other uniform or non-uniform groups.

Unlike the suction cups 250, the suction cups 350 have through holes 357 formed therethrough. More specifically, the through hole 357 is an air flow passage that passes from the first surface 310 to the second surface 312. In other words, the through hole 357 is open along the top surface 310 and the bottom surface 312. The through hole 357 is formed centrally within the suction cup 350. The suction cup 350 also has a corresponding structure formed along the top surface 310. More specifically, each suction cup 350 has a curved roof portion 360. The curved roof portion 360 has a convex shape that is formed along the top surface 310. The through hole 355 passes centrally through the curved roof portion 360. The through hole 355 is thus open within the curved roof portion 360 and the bottom suction cup portion 350.

The curved roof portion 360 is not a requirement for the suction cup construction and instead the top surface of the second part 300 can be a planar surface or be a surface that does not have any discrete structures formed therealong. When the first part 200 includes suction cup caps 250, the curved roof portions 360 help to locate the suction cup caps 250. Since each suction cup cap 250 has a concave surface, the convex shaped roof portion 360 has a complementary shape and serves to locate the suction cup cap 250 to cause a mating between the concave suction cup 250 and the convex roof portion 360, thereby closing off the through hole formed in the suction cup.

Figure 10:
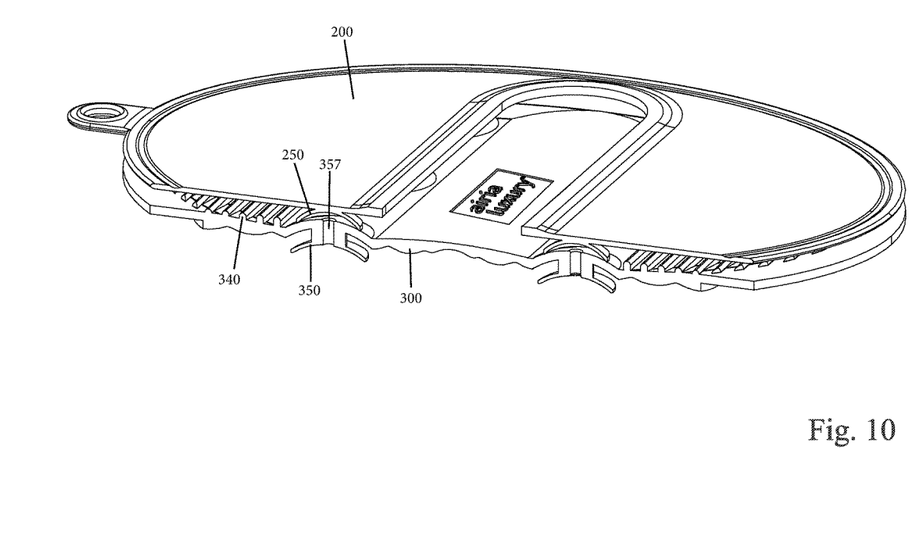

For reasons discussed below, the number of suction cups 350 equals the number of suction cups 250 and the suction cup caps 250 are placed in registration with the suction cups 350 in that one suction cup caps 250 lies above one corresponding suction cup 350. FIG. 10 shows the registration between the suction cup caps 250 and the suction cup 350.

As shown the body 302 can be symmetric in nature about a center axis that extends across a width of the body 302. As shown in FIG. 9, the thickness of the body 302 varies and is not uniform. In particular, the peripheral edge area of the body 302 can be thinner than the first and second end portions 320, 330 that contain the ribs 340.

Use of the Product 100 as a Trivet

With reference to FIGS. 1-10, the product 100 can be used as a trivet. To use the product 100 as a trivet, the product 100 is laid flat on a support surface, such as a table or counter, etc., with the first part 200 being in contact with the support surface. When a load (e.g., a pot or pan) is applied to the second part 300, the second part 300 compresses relative to the first part 200 and the suction cups 350 of the second part 300 move toward the suction cup caps 250 due to the weight of the load, thereby resulting in the suction cup caps 250 covering the curved roof portions 360 of the suction cups 350.

The curved nature of the curved roof portion 360 and the suction cup caps 250 are complementary to allow the suction cup caps 250 to seat against the curved roof portions 360, thereby covering up the through holes 357 of the suction cups 350.

This action causes the suction cup caps 250 to cover up the through holes 357 passing through the suction cups 350, thereby allowing the suction cups 350 to work and operate as suction cups. The trivet (product 100) will thus be able to adhere to the load since the suction cups 350 work.

It will be understood that the loading bearing object (e.g. pot or pan) is placed on the bottom surface of the second part 300.

Thus, to use the accessory 100 as a trivet, the user places the first part 100 facing downward on a support surface, such as a table or countertop. In this orientation, the suction cups 350 face upward. The user then places a hot object (such as a pan or pot) on top of the suction cups 350 to cause the suction cups 350 to adhere to the bottom surface of the hot object. In this manner, the object can be detachably attached to the accessory 100. The actuation of the suction cups 350 causes the attachment between the two.

Use of the Product 100 as an Oven Mitt

With reference to FIGS. 1-10, the product 100 can be used as an oven mitt. To use the product 100 as an oven mitt, the wearer's hand is inserted through the opening 105 into the interior space formed between the first and second parts 200, 300. It will be appreciated that the wearer's thumb can be inserted into one half of the interior space and the fingers of the wearer can be inserted into the other half of the interior space, thereby allowing the wearer to effectively bring one end portion of the product 100 toward the other end portion of the product 100 as is done with a conventional oven mitt. The wearer's thumb and fingers contact the ribs 340.

The presence of the wearer's hand within the interior space (between the first and second parts 200, 300) prevents the suction cup caps 250 from covering the through holes 357 since the parts 200, 300 are separated by the presence of the user's hand therebetween. Since the through holes 357 are left uncovered, air can freely flow through the through holes 357 and exit and the top surface 310 of the body 302. This passage of air prevents the suction cups 350 from adhering to any surface, such as a handle of a pot or pan. Thus, the product 100 can be freely used as an oven mitt without worrying about the suction cups 350 adhering to any surface and causing the oven mitt to adhere to such surface which is not desired.

It is to be understood that like numerals in the drawings represent like elements through the several figures, and that not all components and/or steps described and illustrated with reference to the figures are required for all embodiments or arrangements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As discussed herein, an "operable" suction cup, an "active" suction cup or a suction cup in the "on mode" is one in which the cavity which develops between the suction cup and a flat surface has little to no air or water in it because most of the fluid has already been forced out of the inside of the cup, causing a lack of pressure (as a result of the through hole being covered). The pressure difference between the atmosphere on the outside of the suction cup and the low-pressure cavity on the inside of the suction cup keeps the suction cup adhered to the surface.

Conversely and as discussed herein, an "inoperable" suction cup, an "inactive" suction cup or a suction cup in the "off mode" is one in which the cavity which develops between the suction cup and a flat surface is not evacuated and instead, there is air or water in it because the through hole of the suction cup is uncovered and air can freely flow into the this cavity. As a result, there is a lack of low pressure on the inside of the suction cup and the suction cup cannot adhere to the surface.

Various modifications and changes can be made to the subject matter described herein without following the example embodiments and applications illustrated and described, and without departing from the true spirit and scope of the present invention, as set forth in each and any of the following claims.

What is claimed is:

1. A kitchen accessory that is configured to be used a trivet and an oven mitt comprising:
a flexible body formed of a first part and a second part that are coupled to one another along so as to form an interior space defined between the first part and the second part and configured to receive a hand of a wearer, the first part including an opening that provides an entrance to the interior space to allow the accessory to be used as the oven mitt; and
a plurality of suction cups formed along a bottom surface of the second part, each suction cup having a curved lower surface and a through hole formed therein from a top surface of the second part through the curved lower surface of the suction cup, the through hole being in fluid communication with the interior space;
wherein an underside of the first part is configured such that when the accessory is used as a trivet, the underside of the first part covers and seals the through holes of the suction cups, wherein when the accessory is used as the oven mitt, the underside of the first part is spaced from the second part at least in a region above the suction cups resulting in the through holes of the suction cups being open.

2. The accessory of claim 1, wherein the first and second parts are each formed of a heat insulation material that is configured to bend.

3. The accessory of claim 2, wherein the first and second parts comprise a silicone material.

4. The accessory of claim 1, wherein the opening of the first part is sized to receive the hand of the wearer.

5. The accessory of claim 1, wherein the first and second parts are stitched together along peripheral edges thereof.

6. The accessory of claim 1, wherein the underside of the first part contains a plurality of suction cup caps that generally overlie the suction cups of the second part and the through hole formed in each suction cup of the second part extends from a top surface of the second part to a bottom surface of the second part.

7. The accessory of claim 6, wherein the second part includes a plurality of convex portions formed along the top surface of the second part, each convex portion being located above one respective suction cup formed along the bottom surface of the second part and also in registration with one corresponding suction cup cap formed on the underside of the first part, the through hole being open within the convex surface.

8. The accessory of claim 7, wherein when the accessory is used as a trivet a load applied to the second part causes the suction cap caps to seat against and cover the respective through holes formed through the respective suction cups.

9. The accessory of claim 1, wherein a top surface of the second part includes a plurality of ribs oriented transversely across the second part.

10. The accessory of claim 9, wherein the top surface of the second part includes a central area that underlies the opening of the first part so as to be visible therethrough, the central area for placement of indicia.

11. A kitchen accessory that is configured to be used a trivet and an oven mitt comprising:
a flexible body formed of a first part and a second part that are coupled to one another along peripheral edges thereof so as to form an interior space defined between the first part and the second part and configured to receive a hand of a wearer, the first part including an opening that provides an entrance to the interior space to allow the accessory to be used as the oven mitt;
a plurality of concave shaped suction cup caps formed along a bottom surface of the first part; and
a plurality of suction cups formed along a bottom surface of the second part, wherein each suction cup has a through hole passing therethrough from the bottom surface to a top surface of the second part, the suction cup caps being in registration with the suction cups such that in a trivet mode of operation, a load applied to the first part causes the suction cup caps to seat against and close off the through holes formed in the corresponding suction cups, thereby allowing the suction cups to secure the accessory to a support surface;
wherein in an oven mitt mode of operation, the underside of the first part is spaced from the second part at least in a region above the suction cups, thereby rendering the suction cups inoperable due to the through holes being open.

12. The accessory of claim 11, wherein the plurality of concave shaped suction cup caps are disposed along a first row along a first side of the opening and a second row along a second side of the opening opposite the first side.

13. The accessory of claim 12, wherein the opening, the first row of the suction cup caps and the second row of the suction cup caps extend transversely across a width of the flexible body, the width being smaller than a length of the flexible body.

14. The accessory of claim 11, wherein each suction cup includes a convex portion located on a top surface of the second part, the through hole passing centrally through the convex portion.

15. The accessory of claim 14, wherein the convex portions of the suction cups are in registration with the suction cup caps to allow contact therebetween in the trivet mode of operation.

16. A kitchen accessory that is configured to be used a trivet and an oven mitt comprising:
a flexible body formed of a first layer and a second layer that are coupled to one another so as to form an interior space defined between the first layer and the second layer and configured to receive a hand of a wearer, the first layer including an opening that provides an entrance to the interior space to allow the accessory to be used as an oven mitt; and
a plurality of complementary suction cups formed along a bottom surface of the second layer, wherein each suction cup has a through hole passing therethrough from the bottom surface to a top surface of the second layer;
wherein in a trivet mode of operation, a load applied to the bottom surface of the second layer results in contact between the first and second layers and renders the suction cups operable for securing the flexible body to a support surface;
wherein in an oven mitt mode of operation, the first and second layers are separated from one another, thereby rendering the suction cups inoperable due to the through holes being open.

17. An article that has a selectively actuatable suction cup construction for allowing the article to be selectively adhered to an object, the article comprising:
a first layer having an inner surface, an opposing outer surface, and an opening extending through the first layer;
a second layer having an inner surface and an opposing outer surface, the first layer and second layer being coupled to one another along peripheral areas of each of the first layer and the second layer so as to define an interior space between the first layer and the second layer, the opening of the first layer defining an entrance to the interior space;
a plurality of suction cups formed along the outer surface of the second layer for securing the article to the object, each suction cup of the plurality of suction cups having a curved lower surface and a through hole extending from the inner first surface of the second layer through the curved lower surface;
wherein in an actuated mode of use, the inner surface of the first layer contacts the inner surface of the second layer and covers the through holes of the suction cups, and wherein in an inactive mode of use, the inner surface of the first layer is spaced from the inner surface of the second layer at least in a region above the suction cups resulting in the through holes being open and uncovered.

18. The article of claim 17, wherein the article is selected from the group consisting of a kitchen accessory and a shower accessory.

* * * * *